United States Patent [19]

Bergman et al.

[11] Patent Number: 4,864,453
[45] Date of Patent: Sep. 5, 1989

[54] PROTECTIVE RELAY WITH SELECTIVE PHASE SELECTION FOR DOUBLE LINES

[75] Inventors: Sten Bergman; Stefan Ljung, both of Västerås, Sweden

[73] Assignee: Asea Brown Boveri AB, Västerås, Sweden

[21] Appl. No.: 286,141

[22] Filed: Dec. 19, 1988

[30] Foreign Application Priority Data

Dec. 29, 1987 [SE] Sweden .................... 8705183

[51] Int. Cl.⁴ .................................... H02H 3/28
[52] U.S. Cl. ............................. 361/66; 361/81; 361/82; 361/84; 324/107; 324/522; 364/483
[58] Field of Search ............... 361/65, 66, 62, 78, 361/79, 80, 81, 82, 84, 86, 87; 324/107, 522, 539, 541; 364/481, 483, 492, 495

[56] References Cited

U.S. PATENT DOCUMENTS

| | | | |
|---|---|---|---|
| 4,148,087 | 4/1979 | Phadke | 361/80 |
| 4,261,038 | 4/1981 | Johns et al. | 361/79 X |
| 4,319,329 | 3/1982 | Girgis et al. | 361/78 X |
| 4,321,681 | 3/1982 | Sackin et al. | 361/79 X |
| 4,466,071 | 8/1984 | Russell, Jr. | 361/83 |
| 4,577,254 | 3/1986 | Yamaura | 361/80 |
| 4,617,636 | 10/1986 | Johns et al. | 361/79 X |
| 4,625,283 | 11/1986 | Hurley | 361/483 X |
| 4,636,909 | 1/1987 | Brandt | 361/80 |
| 4,774,621 | 9/1988 | Andow | 361/80 |
| 4,795,983 | 1/1989 | Crockett et al. | 324/522 X |

FOREIGN PATENT DOCUMENTS 0015259 1/1983 European Pat. Off. .

OTHER PUBLICATIONS

"A New Computer Based Integrated Distance Relay for Parallel Transmission Lines", Phadke et al., IEEE Transaction on Power Apparatus and Systems, vol. 104, No. 2, Feb. 1985.

Primary Examiner—A. D. Pellinen
Assistant Examiner—Howard L. Williams
Attorney, Agent, or Firm—Watson, Cole Grindle & Watson

[57] ABSTRACT

The invention comprises a protective relay with selective phase selection in electric power distribution systems when there are double transmission lines (M1-P1,M2-P2) between two stations (TM, TP) and where the ends of the line are connected to a common busbar system located in each station. The protective device includes a protection unit, terminal, at both ends of each line. All the terminals (M1, M2, P1, P2) include an identical basic design for measurement of phase quantities (17), filtering (18) and A/D conversion (19); furthermore, the identical part includes a parameter estimator (20) for Fourier series expansion of measured phase signals and generation of the respective residuals. The parameter estimator cooperates with a frequency estimator (21) and a sampling regulator (22). Each basic design also includes a local logic unit which, by transient and steady state analysis, finds out whether an event on the network is due to a fault or a connection/-disconnection of the phase/line and the current direction at each terminal. At one of the terminals, at both stations, there is a station master unit (26) which compiles all information for the station in question, calculates the distance to a fault, etc. For final decisions as to whether a recorded fault lies between the stations, as to faulty line(s) and phase(s), all information from the two stations is compiled in a superordinate unit (29) in one of the terminals at one of the stations.

2 Claims, 2 Drawing Sheets

PROTECTIVE RELAY WITH SELECTIVE PHASE SELECTION FOR DOUBLE LINES

TECHNICAL FIELD

For reasons of security, extension and economy, and other reasons, sometimes double electric power transmission lines are used between two stations. In practice, each station is then provided with a busbar system to which the two lines are connected. Normally, the maximum distance between the connection of the lines to the same busbar system amounts to 20-30 m. The supply concept, i.e. the current direction in the lines, may be different depending on the load and the supply of electric power.

It has been found to be difficult to make a correct phase selection in the case of a fault on any phase or line in a double line system. It seems to be particularly difficult to distinguish single-phase faults which occur at short time intervals in different phases on the two lines. The present invention entails considerably improved conditions for a proper fault judgment. Also, only the necessary measures, for example a single-phase disconnection, need be taken.

BACKGROUND ART, THE PROBLEM

As protection against ground faults on double lines, according to the state of the art distance relays are usually used, which are normally based on impedance measurement. Within the current technical field these are so well-known that no further description of them will be made. Different embodiments are disclosed, for example, in U.S. Pat. No. 4,636,909 (Brandt).

As mentioned by way of introduction, the use of impedance based protection devices in connection with double lines entails certain problems of distinguishing faults, for example when a phase fault in different phases occurs on the lines at short time intervals. This has proved to be particularly difficult on double line systems which comprise series capacitors. In the case of a fault according to the above, in this situation normally all the phases of a conventional distance relay trip, which is due to the fact that they are not capable of distinguishing the situation from the case where a multi-phase fault has occurred in one of the double lines. Thus, all three phases are disconnected, even when in reality it would have been possible to break only the faulty phase.

The impedance plane analysis can be performed both analogically and with the aid of computerized programs. In an article by Phadke and Jihuang published in IEEE Trans. on PAS, Vol. PAS-104, No. 2, February 1985, pp. 445-452, entitled "A Computer Based Integrated Distance Relay for Parallel Transmission Lines", a method is described which is based on impedance plane analysis of the status of the line seen from one end. A measuring point is placed at one end of each line and the results are coordinated. However, this may be a dangerous method since it may be difficult to analyze such cases where the fault occurs in the vicinity of the other end of the line. A method of overcoming this deficiency is provided by the technique described in EP 0 015 259 entitled "A method and a device for detection of the position of a fault in an electric connection". According to this method, a relay unit is used at each end and each line of the protected line zone. However, also in this case there is still a need to study impedances to determine in what phase(s) and what line all the faults occur.

The technical basis for protection using selective phase selection in connection with double lines according to the invention is based on the technique which is described in detail in U.S. patent applications Ser. Nos. 241,370 and 262,742, respectively. A brief resumé of these applications will be given here.

Measured signals for phase currents and phase voltages obtained from the power network are transformed, after filtering and digitization, into an analytical model in the form of a harmonic truncated Fourier series ($M = a_1 \sin \omega_0 t + a_2 \cos \omega_0 t$). The Fourier coefficients are determined in a parameter estimator operating with an estimation method according to the least squares method. With the aid of the model an exact calculation can be made of the fundamental frequency of the model in a frequency estimator, the output signal of which is returned to the parameter estimator. U.S. application Ser. No. 241,370 shows, for example, that the angular frequency $\omega$ for the model can be calculated with the aid of three consecutive sample values $y_1, y_2, y_3$ of the processed signal as $$\omega = h^{-1} \arccos \frac{y_1 + y_4}{2y_2}$$

where h is the distance in time between the sample values.

The current parameter estimation method will be clear from the following.

The measured signals in question can, in general, be modelled by $$y(t) = a_0 \exp(-b_0 t) + \sum_{1}^{N} c_j \sin(\omega_j t + d_j) \qquad (1)$$

which can be transformed into $$y(t) = \theta^T \phi(t) \qquad (2)$$

where $$\theta^T = (a_0, -c_0 b_0, c_1 \cos d_1, c_1 \sin d_1, \ldots c_N \cos d_N, c_N \sin d_N) \qquad (3)$$

is a parameter vector and $$\phi(t) = (1, t, \sin \omega_0 t, \cos \omega_0 t, \ldots \sin N\omega_0 t, \cos N\omega_0 t) \qquad (4)$$

is a regression vector.

Estimation of the parameters according to the least squares method entails that the value of a "loss function" $V_N$ is minimized. $V_N$ can be written as $$V_N(\lambda, t) = \sum_{j=1}^{t} \lambda^{t-1} \epsilon^2(j) = \lambda \cdot V_N(\lambda, t-1) + \epsilon^2(t) \qquad (5)$$

where $\lambda$ is a forgetting factor and where $\epsilon(t)$ is an estimation error function (a residual) as defined by (11).

The minimization gives the following equation to compute an estimation to $\theta(t)$, $\theta$ $$\theta(t) = \qquad (6)$$

-continued $$\left[\lambda^{tp-1}(0) + \sum_{j=1}^{t} \lambda^{t-j}\phi(j)\phi^T(j)\right]^{-1}\left[\sum_{j=1}^{t} \lambda^{t-j}\phi(j)y(j)\right]$$

The actual estimation is performed recursively with the aid of the following algorithm $$R(t) = \lambda \cdot R(t-1) + \phi(t)\phi^T(t) \quad (7)$$

$$R(O) = \delta \cdot I \quad (8)$$

$$R(t)L(t) = \phi(t) \quad (9)$$

$$y(t) = \theta^T(t-1)\phi(t) \quad (10)$$

$$\epsilon(t) = y(t) - \hat{y}(t) \quad (11)$$

$$\theta(t) = \theta(t-1) + L(t)\epsilon(t) \quad (12).$$

Here, R(t) is the covariance matrix of the regression vector and P(t), according to the following, is the inverse thereof. Otherwise, the following recurrence formulae will be used:

$$r(t) = P(t-1)\phi(t) \quad (13)$$

$$d(t) = \lambda + \phi^T(t)r(t) \quad (14)$$

$$L(t) = r(t)/d(t) \quad (15)$$

$$P(t) = (P(t-1) - r(t)L^T(t))/\lambda \quad (16)$$

$$P(O) = (1/\delta) \cdot I \quad (17)$$

$$\theta(O) = \theta_0 \quad (18).$$

Otherwise, the same criteria as are used in the above-mentioned Swedish applications are used in this protective concept as well as regards phase selection and determination of direction to a fault and as regards the possibilities of distinguishing a fault situation from a connection or disconnection of a phase and/or a line.

These criteria can be described as follows. A test whether an abrupt event has occurred is performed as a transient analysis of suitable loss functions according to (5) by comparing the values of the functions against set threshold values. If the limit values have been exceeded, a steady state analysis is performed in order to find out whether the event is due to a fault or to a connection/-disconnection of a phase and/or a line. This can be done by a study of the Fourier components before and after the event. If the result of this analysis shows that a fault has occurred, the faulty phase can be determined by the study of the loss function of th phase voltages or by a study of the amplitude of the harmonics.

Knowledge of the direction to a fault can be obtained by finding out the current direction of the two end points, which can be done with the aid of a study of the polarity of the current residuals after the determination of a fault. This presupposes that measuring stations are provided on both sides of the protected line and the communication facilities are provided between the two ends of the line. To determine whether the fault occurs in the protected line, it is sufficient to study two situations, namely, whether the currents at both end points are directed away from the line or towards the line. In both of these cases the fault is located on the protected line if the signs on the residuals are the same.

DISCLOSURE OF THE INVENTION

The protection concept for high resistance ground faults for double lines according to the invention will be described with reference to a combined function and action chart according to FIG. 1. Between two stations TM and TP there are two parallel transmission lines, one so-called double line, connected to a busbar system in each station. One of the lines is designated M1-P1 and the other M2-P2. At each line end there is a local protection unit or terminal, designated M1 and M2 at station TM and P1 and P2 at station TP, respectively.

All the protection units comprise certain identical basic components/functions according to known technique, which are needed to implement the invention and which have roughly been described under the heading "BACKGROUND ART, THE PROBLEM". The description of these according to FIG. 1 will only comprise the protection unit at terminal M1.

Figure 1:
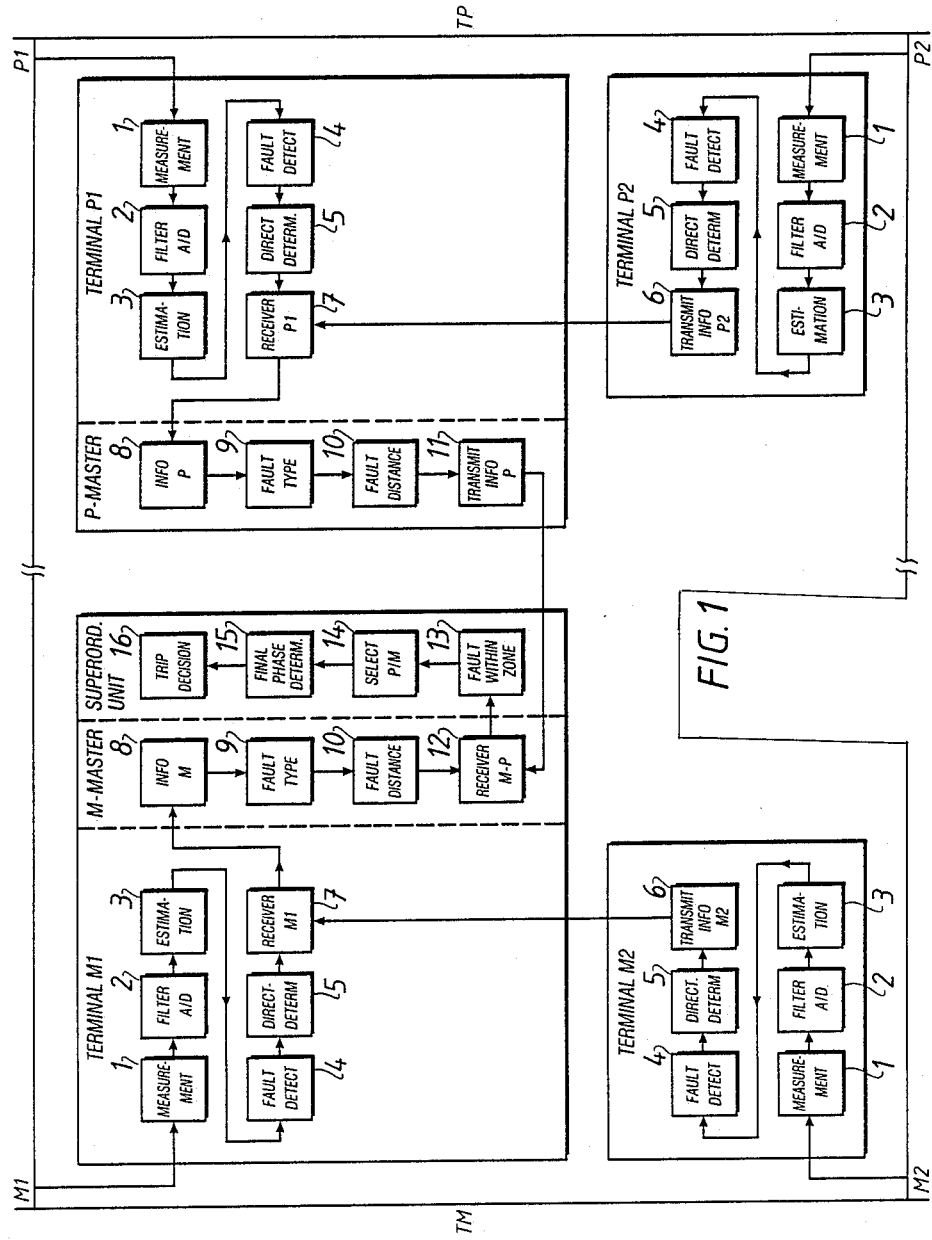
FIG. 1 shows a combined function and action diagram for a protective relay according to the invention.

The function MEASUREMENT, indicated at 1, comprises measurement of all the phase currents and voltages at the measuring point, i.e. in FIG. 1 at the line M1-P1 at the end M1. The function FILTER A/D, at 2, comprises high frequency filtering and analog-to-digital conversion of the measured phase quantities.

The function ESTIMATION, at 3, is to be described in more detail. It comprises a method for estimation of the Fourier coefficients of the measured signals, which also includes a method for estimation of the frequency of the measured signals, and a sampling regulator for adaptation of the sampling time so that the number of nodal points per cycle is constant. In addition to estimated values of coefficients and frequency, this function also comprises generation of the residuals $\epsilon(t)$ of the measured signals, i.e. the estimation errors.

The function FAULT DETECT, at 4, comprises computation of a number of loss functions and local logic decisions based on the operating values obtained. This part will also be described in some more detail as applied to the current protection concept. As described above under "BACKGROUND ART", the fault detection comprises a transient and a steady state analysis. An abrupt event in M1 can be determined if the loss functions $$V_{M1}^{\sigma p}(t) = \sum_{j=1}^{t} \lambda^{t-j}(\epsilon_{M1}^{\sigma p}(j))^2 = \lambda V_{M1}^{\sigma p}(t-1) + (\epsilon_{M1}^{\sigma p}(t))^2 \quad (19)$$

with $\sigma \epsilon$(E: phase voltage, I: phase current) and $\rho \epsilon$(R, S, T) exceed the set threshold values.

With $x \epsilon$(M, P) and $n \epsilon$(1, 2), the loss functions for all the terminals can be expressed as $$V_{xn}^{\sigma p}(t) = \sum_{j=1}^{t} \lambda^{t-j}(\epsilon_{xn}^{\sigma p}(j))^2 = \lambda V_{xn}^{\sigma p}(t-1) + (\epsilon_{xn}^{\sigma p}(t))^2 \quad (20)$$

An abrupt event can thus be determined if, for any combination of the parameters $\rho$, x, n, any of the following relations is valid $$V_{xn}^{Ep}(t) > \eta_E \tag{21}$$

$$V_{xn}^{Ip}(t) > \eta_I \tag{22}$$

i.e. when any of the threshold values has been exceeded.

As will also have been clear from the description of the prior art, this criterion is not sufficient to determine whether what has occurred is due to a conventional fault or if it is due to a (dis)connection of any phase(s) or line. The steady state analysis which is necessary for this can be performed as follows.

If a function f ($a_1$, $a_2$) of the Fourier components $a_1$ and $a_2$ of the fundamental component of any of the phase voltages is lower than a set limit value, for example $\theta_0$, this indicates that the phase in the corresponding line is disconnected. This can, for example, be determined by studying the inequality $$\sqrt{a_1^2 + a_x^2} < \eta_0 \tag{23}$$

So that the protective device at one terminal should not give an incorrect indication in the case of connection of a line, in the same way as above a steady state analysis is also required, which is also suitably based on Fourier components, expressed, for example, by the inequality $$\sqrt{a_1^2 + a_2^2} > \eta_i \tag{24}$$

However, it is necessary that a certain time elapses from the indication of an abrupt event until the testing according to the above relation is performed.

Now, if both the transient and the steady state analyses have shown that a fault has occurred, the direction to the fault is to be determined. This is done with the function DIRECT.DETERM. according to 5 in FIG. 1. For this purpose the current directions in all protection units have to be determined. An indirect determination of the current direction can be obtained, as stated above, by studying the signs of the current residuals. To obtain a representative value, the polarity should be studied for a certain period of time, which can be done by a simple integration, for example by studying the functions $$W_{xn}^{Ip}(t) = W_{xn}^{Ip}(t-1) + \epsilon_{xn}^{Ip}(t) \tag{25}$$

for associated values of x, n and $p$. Depending on how the current directions are defined and the sign of the W-quantities, corresponding to the currents, it is possible, as is clear from above, to determine whether the fault is located behind, i.e. outside the zone, or located ahead, i.e. on the line side of the station.

As will be clear from FIG. 1, the functions 1–5 are equal for all four protection units. For directional determination, etc., at each station, communication between the protection units at M1 and M2 and between P1 and P2, respectively, is needed. It is then suitable to designate one of the terminals at each station as master. From FIG. 1 it is clear that, in the example shown, these master functions have been assigned to terminals M1 and P1.

The functions according to 6 at terminals M2 and P2, i.e. TRANSMIT INFO M2 and TRANSMIT INFO P2, respectively, comprise the transmission of data concerning the fault, the direction to the fault and residuals to RECEIVER M1 and RECEIVER P1, respectively, at 7, at terminals M1 and P1, respectively. Because of the short distance between M1 and M2 and P1 and P2, respectively, no communication problems may arise, since optical fibre technique offers a feasible medium for communication.

The assigned M- and P-masters are provided with the functions INFO M and INFO P, respectively, as shown at 8. These functions are supplied with the available information from M1, M2 and P1, P2, respectively, whereby opportunities are created for determining the direction to a fault, the fault type and the fault distance. If, for example, both terminals at TP, according to the criteria described above, show that it is a question of a fault lying behind (outside of the zone), the fault has occurred outside of the protected lines. On the other hand, if, for example, terminal P2 indicates a fault lying behind and terminal P1 indicates a fault lying ahead, this indicates that the fault is to be found on the line P1-M1. However, the fault may be located behind terminal M1. The reverse is, of course, true for a fault on the line P2-M2. The corresponding reasoning and result are obtained with the M-master. As has been mentioned above, however, for the final determination of the direction to the fault and of the phase, communication is necessary also between the two stations.

The function FAULT TYPE, shown at 9, comprises the determination of what phase or phases is/are faulty (see table 1). As previously described, this can be determined by studying the loss functions of the phase voltages or by studying the amplitude of the harmonics.

As has also been mentioned previously, it is necessary to make an approximate judgment of the fault distance to be able to see what station pair lies nearest to the fault and thus gain increased certainty in the final determination of the faulty phase, which can be difficult when the fault is located far from one of the stations. With the function FAULT DISTANCE, shown at 10, such an approximate determination can be made with the aid of the Fourier coefficients for the currents and the voltages.

All information from the M- and P-masters is now to be put together for the final decision on what measures to take with respect to the fault. For this purpose, a superordinate unit must be provided, which in FIG. 1 is shon integrated into terminal M1. Via the function TRANSMIT INFO P, shown at 11, collected P-information is transmitted to the M-master, which via the function RECEIVER M-P, at 12, conveys the collected M- and P-information to the superordinate unit (SUPERORD. UNIT).

With the aid of the directional information from both the M- and P-sides, it can now be definitively determined, via the function FAULT WITHIN ZONE at 13, whether the fault which has occurred lies on the double line and possibly on which of the lines, or if it lies on both. The decision logic is based on the below table 1, where B stands for a fault lying behind or outside and A stands for a fault lying ahead. Since for each one of the four terminals two different fault directions are available, there will be sixteen possible final alternatives. As will be clear from the table, in seven of the alternatives the fault is located outside the protected zone, which means that at least one of the pairs has detected that the fault is located behind the nearest busbar. In three of the cases, the fault is located on line 1 and in three of the cases it is located on line 2. When all the terminals indicate that the fault has occurred in front of the measuring points, there is a fault on both the lines. Then three cases remain, namely, when the pairs indicate a fault on different lines. If any of these situations arises, the faulty phase is determined starting from the measuring pair which is closest to the source of the fault. It should be noted that this table is based on binary information and the direction from each of the terminals for one phase. This means that the superordinate unit must handle three such tables at the same time. In this way, the logic is able to determine whether faults, which occur in different phases, lie outside or within the zone.

TABLE 1

| TERMINAL | M1 | | M2 | | P1 | | P2 | | |
|---|---|---|---|---|---|---|---|---|---|
| CURRENT DIRECTION | B | A | B | A | B | A | B | A | DECISION |
| ALTERNATIVES | | | | | | | | | |
| 1 | X | | X | | X | | X | | |
| 2 | X | | X | | X | | | X | |
| 3 | X | | X | | | X | X | | FAULT |
| 4 | X | | | X | X | | | X | OUTSIDE |
| 5 | | X | X | | X | | | X | THE ZONE |
| 6 | X | | | X | X | | | X | |
| 7 | X | | X | | | X | | X | |
| 8 | | X | X | | | X | X | | FAULT |
| 9 | | X | X | | | X | | X | ON LINE |
| 10 | | X | | X | | X | X | | M1-P1 |
| 11 | X | | | X | X | | | X | FAULT |
| 12 | X | | | X | | X | | X | ON LINE |
| 13 | | X | | X | X | | | X | M2-P2 |
| 14 | | X | X | | X | | | X | INDEFINITE |
| 15 | X | | | X | | X | X | | FAULT |
| 16 | | X | | X | | X | | X | FAULT ON BOTH |

To obtain the best best conditions for a correct phase selection, data from that side which is nearest the source of the fault shall be determining. With the function SELECT P/M at 14, the most suitable side is thus selected, based on the calculation of the fault distance at 10. With the aid of these data, the final phase determination is made with the function FINAL PHASE DETERM., at 15, by studying the current residuals or Fourier coefficients in question.

For evaluation of the final TRIP DECISION, at 16, according to the following table 2 nineteen different alternatives or combinations are available to decide about.

TABLE 2

| ALTERNATIVES | CHARACTERISTICS | DECISIONS/ACTIONS |
|---|---|---|
| 1 | FAULTLESS STATE | NONE |
| 2 | $R_M$-FAULT | |
| 3 | $S_M$-FAULT | DESIGNATED |
| 4 | $T_M$-FAULT | PHASE |
| 5 | $R_P$-FAULT | SHOULD BE |
| 6 | $S_P$-FAULT | DIS- |
| 7 | $T_P$-FAULT | CONNECTED |
| 8 | $R_M$-$R_P$-FAULT | |
| 9 | $R_M$-$S_P$-FAULT | DESIGNATED |
| 10 | $R_M$-$T_P$-FAULT | PHASE |
| 11 | $S_M$-$R_P$-FAULT | IN EACH LINE |
| 12 | $S_M$-$S_P$-FAULT | SHOULD BE |
| 13 | $S_M$-$T_P$-FAULT | DIS- |
| 14 | $T_M$-$R_P$-FAULT | CONNECTED |
| 15 | $T_M$-$S_P$-FAULT | |
| 16 | $T_M$-$T_P$-FAULT | |
| 17 | MULTI-PHASE FAULT IN LINE M1-P1 FAULTLESS IN LINE M2-P2 | ALL PHASES IN M1-P1 DISCONNECTED |
| 18 | MULTI-PHASE FAULT IN LINE M2-P2 FAULTLESS IN LINE M1-P1 | ALL PHASES IN M2-P2 DISCONNECTED |
| 19 | MULTI-PHASE FAULT IN ONE LINE SINGLE-PHASE FAULT IN THE OTHER | ALL PHASES IN BOTH DISCONNECTED |

DESCRIPTION OF THE PREFERRED EMBODIMENTS

Figure 2:
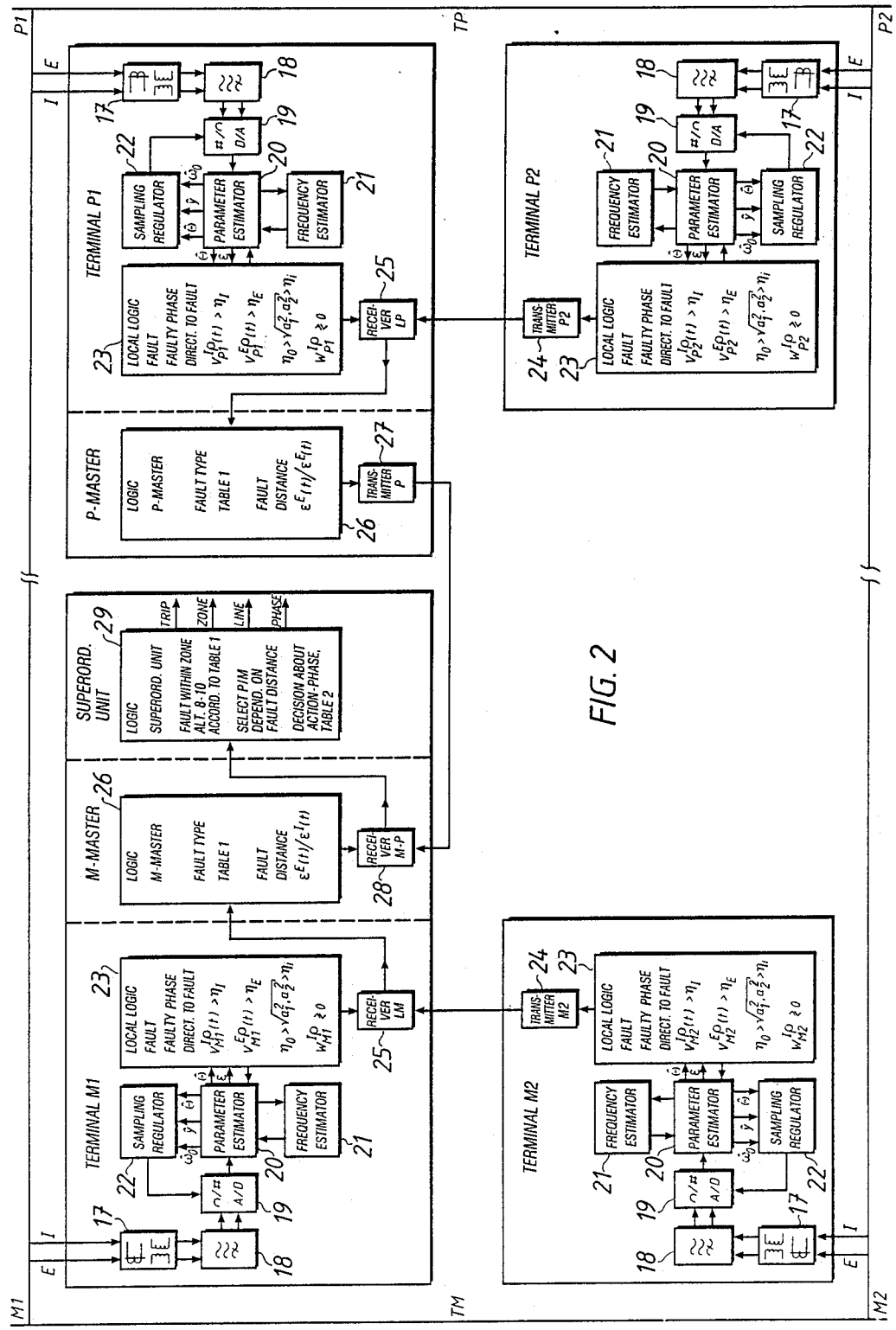
FIG. 2 shows a preferred embodiment of a protective relay with selective phase selection for double lines.

FIG. 2 shows a preferred embodiment of a protective relay with selective phase selection for double lines according to the invention. For natural reasons, FIG. 2 shows great resemblance to the function and action chart according to FIG. 1. Between the two stations TM and TP there is a double line, one of which being referred to as M1-P1 and the other being referred to as M2-P2. At each line end there is a terminal, designated M1, M2, P1 and P2. The terminals are supplied with all the respective phase voltages and currents, commonly designated E and I. The basic design for all four terminals is the same and the reference numerals for the same parts included are therefore the same. The measurement of the incoming phase quantities is performed, in principle, in a measuring device 17. After high-frequency filtering in filter 18, the signals are converted from analog to digital representation in the A/D convertor 19. Further, each basic design comprises a Fourier parameter estimator 20 and a frequency estimator 21 according to known technique. Also included is a sampling regulator 22, the task of which, as will have been clear, is to ensure that the sampling time is adapted in accordance with current frequency changes of the processed signals. Since the gain vector L(t) according to 15 is calculated during the initialization, it is necessary to adapt the time between the samplings such that the number of sample points per cycle is constant. This means that the sampling regulator must be supplied with the current frequency value $\omega_0$, the estimated Fourier signal y, and the parameter estimation vector $\theta$.

Furthermore, the basic design comprises a local logic unit 23 which, with the aid of residuals, calculates the current loss functions, compares these with the respective threshold values set, carries out the necessary transient and steady state analysis to determine whether a fault has occurred, and at the same time finds out the current direction at the respective terminal.

The information thus obtained at terminals M2 and P2 is transmitted, in principle, via transmitter 24 to receiver 25 at terminals M1 and M2. This information, together with corresponding information from M1 and P1, is led to a logic M-master and logic P-master unit 26 located at terminals M1 and P1. Here a collected determination of the information of the M-side and the P-side as well as an approximate judgment of the fault distance from the respective station are made, suitably by determining the impedance up to the site of the fault with the aid of the Fourier coefficients.

The collected information from the P-side is then transmitted in principle by some known technique, via a transmitter 27 to a receiver 28 in the M-master unit of terminal M1. This information, together with corresponding information from the M-side, is passed to a logic superordinate unit 29, located in terminal M1. For the protective device according to the invention, this logic unit makes the final decisions as to whether the fault is located within the line zone in question, i.e. on any of the lines between stations TM and TP, finds out which of the P-side or M-side lies nearest the fault and allows that side to be determining in connection with the decision on how to act. A possible trip signal can thus be obtained, as well as information about zone, line and phase.

It is, of course, of no consequence to which terminals the different master functions are referred. The transmission of information between the two terminals at one station and between the two stations, respectively, can, of course, also be performed using different technical media depending on the technical conditions which otherwise exist at the stations.

We claim:

1. A protective relay with selective phase selection in electric power distribution systems when there are double transmission lines between two stations (TP, TM) and where the ends of the line are connected to a common busbar station in each station, which protective relay, consisting of a protection unit at a terminal (M1, M2, P1, P2) at both ends of the line, comprises an identical basic design arranged in each protection unit having a measuring device (17) for measuring the current (I) and voltage (E) of the phase quantities, a filter (18) for high-frequency filtering of the measured signals and an A/D convertor (19) for conversion from analog to digital representation of the measured and filtered signals, said digital signals being adapted to be supplied to a Fourier coefficient estimator (20) cooperatiing with a frequency estimator (21) and a sampling regulator (22), said Fourier coefficient estimator being adapted to generate the Fourier components ($\theta$) for a truncated model $(M) = a_1 \sin \omega_0 t + a_2 \cos \omega_0 t$ of measured phase quantities and the respective residuals ($\epsilon(t)$), characterized in that the Fourier components estimated by the parameter estimator and the residuals are adapted to be supplied to a local logic unit (23) adapted to determine whether an abrupt event has occurred in the power distribution system by comparing the loss functions $V_{xn}^{E\rho}(t)$ and $V_{xn}^{I\rho}(t)$ with the respective threshold values $\eta_E$ and $\eta_I$ according to $$V_{xn}^{E\rho} = \sum_{j=1}^{t} \lambda^{t-j}(\epsilon_{xn}^{E\rho}(j))^2 = \lambda V_{xn}^{E\rho}(t-1) + (\epsilon_{xn}^{E\rho}(t))^2 > \eta_E$$

$$V_{xn}^{I\rho} = \sum_{j=1}^{t} \lambda^{t-j}(\epsilon_{xn}^{I\rho}(j))^2 = \lambda V_{xn}^{I\rho}(t-1) + (\epsilon_{xn}^{I\rho}(t))^2 > \eta_I$$

where xn $\epsilon$(M1, M2, P1, P2), E indicates that V-functions and residuals are based on voltage values, I indicates that the same functions are based on current values, $\rho\epsilon$(R, S, T), $\lambda$ is a forgetting factor within the range 0.9–1.0, and that, if the threshold values have been exceeded, the local logic unit is adapted to initialize a restart of the parameter estimator and determine whether the abrupt event derives from a conventional fault in the power distribution system by comparing a function $f = \sqrt{a_1^2 + a_2^2}$ with two threshold values $\eta_0$ and $\eta_i$ according to $\eta_0 > \sqrt{a_1^2 + a_2^2} > \eta_i$, and if the function lies within the threshold region, the local logic unit is further adapted to determine the current direction at each terminal by determining whether the signals of the integrated current residuals according to $$W_{xn}^{I\rho} = W_{xn}^{I\rho}(t-1) + \epsilon_{xn}^{I\rho}(t)$$

are greater than or smaller than zero, and that at one of the terminals (M2, P2) at each station there is arranged a transmitter (24) intended to transmit the information, obtained in the local logic unit at these terminals, to a receiver (25) in the other terminal (M1, P1) at the same station, and that the information, thus gathered, for each respective station is adapted to be supplied to a master logic unit (26) which is adapted, for each of the stations, to coordinate information about the direction to a fault and a faulty phase or faulty phases and, with the aid of the voltage and current residuals, to obtain an indirect measure of the distance from the respective station to a fault, and that in one of the master terminals (P1) there is arranged a second transmitter (27) intended to transmit the station information, collected in that terminal, to a receiver (28) in the master terminal (M1) in the second station, and that the information thus gathered from both stations is adapted to be supplied to a superordinate unit (29) adapted to determine whether a fault is located between the stations and is further adapted to allow the information from the station located nearest the fault to decide on trip signals for a faulty line and/or phase(s).

2. A protective relay with selective phase selection in electric power distribution systems when there are double transmission lines between two stations according to claim 1, characterized in that if the local logic unit at each terminal determines that the function $f = \sqrt{a_1^2 + a_2^2}$ lies outside the threshold values $\eta_0 > \sqrt{a_1^2 + a_2^2} > \eta_i$, the trip signal is to be blocked.

* * * * *